United States Patent [19]

Dietrich et al.

[11] Patent Number: 4,801,404

[45] Date of Patent: Jan. 31, 1989

[54] BORIC ACID COMPOSITIONS

[75] Inventors: Wolf Dietrich, Ladenburg; Volker Beez, Mannheim; Eberhard Giebeler, Schriesheim, all of Fed. Rep. of Germany

[73] Assignee: Rutgerswerke AG, Fed. Rep. of Germany

[21] Appl. No.: 96,399

[22] Filed: Sep. 11, 1987

[30] Foreign Application Priority Data

Oct. 1, 1986 [DE] Fed. Rep. of Germany ....... 3633366

[51] Int. Cl.$^4$ .................. C09K 21/00; C09D 5/16; C09D 5/18; C01B 15/12
[52] U.S. Cl. .................. 252/607; 106/18.13; 106/18.3; 169/45; 252/601; 252/602; 423/279; 423/280; 423/283; 423/284; 427/440; 428/920; 428/921
[58] Field of Search ............... 252/7, 62, 601, 603, 252/607, 608; 106/15.05, 18.11, 18.3, 18.13; 427/254, 351, 393.3, 408, 439, 440; 423/276, 277, 278, 279, 280, 283, 284, 285, 286, 288, 289, 290, 294; 162/159, 160, 161; 428/920, 921

[56] References Cited

U.S. PATENT DOCUMENTS

| | | | |
|---|---|---|---|
| 650,689 | 5/1900 | Litynski et al. | 252/607 |
| 1,382,618 | 6/1921 | Blenio | 252/607 |
| 1,396,264 | 11/1921 | Filippo | 252/607 |
| 1,612,676 | 12/1926 | Vivas | 252/607 |
| 1,738,976 | 12/1929 | Vivas | 252/607 |
| 1,793,357 | 2/1931 | Brown | 252/607 |
| 4,076,540 | 2/1978 | Stossel | 252/5 |
| 4,156,654 | 5/1979 | Blasius | 252/607 |
| 4,172,804 | 10/1979 | Christianson et al. | 252/607 |
| 4,212,675 | 7/1980 | Robinson | 252/607 |
| 4,224,169 | 9/1980 | Retana | 252/607 |
| 4,289,662 | 9/1981 | Blasius | 252/607 |
| 4,292,188 | 9/1981 | Barone et al. | 252/607 |
| 4,382,025 | 5/1983 | Sallay | 252/608 |
| 4,514,326 | 4/1985 | Sallay | 252/607 |

Primary Examiner—Howard J. Locker
Attorney, Agent, or Firm—Bierman and Muserlian

[57] ABSTRACT

A novel suspension of boric acid comprising a concentrated, finely dispersed suspension of boric acid and a small amount of a soluble borate salt in an aqueous medium and a method of preparing the same.

8 Claims, No Drawings

BORIC ACID COMPOSITIONS

STATE OF THE ART

Boric acid and its salts have many commerical uses such as biocide components in wood preservatives such as salt paste wood preservatives and as a fire retardant protection treatment for wood and wood products, especially particle boards and as fire retardant agents.

DEP No. 2,140,051 describes highly concentrated solutions of boric acid in water-soluble amines or polyamines but an amine component, which interferes in many uses, is additionally introduced into the resulting mixtures. Also, these amines following application are washed off or washed out or they evaporate during pressing of the particle board and are harmful to the environment. Analogously, the same applies to the solution of boric acid in ethyleneglycol described in European Pat. No 0,046,380.

According to DEP No. 2,421,289, DEP No. 2,530,295 and DEP No. 2,621,739, flame retardant wooden particle boards are produced by spraying the wood particles used in the production of the plates before glueing with an aqueous solution of a boron compound and an iorganic acid thereby producing the boric acid directly in finely distributed form on the particles. In terms of apparatus, the method is very elaborate and expensive and because of the acids, which must be precisely proportioned and sprayed, the method is not easy to control and can readily lead to faulty products.

OBJECTS OF THE INVENTION

It is an object of the invention to provide a simple and inexpensive boric acid composition which is solvent-free, environmentally safe and easily used and a method of preparing the compositions.

It is further object of the invention to provide concentrated boric acid aqueous suspensions with a uniform particle distribution free of undesired by-products.

These and other objects and advantages of the invention will become obvious from the following detailed description.

THE INVENTION

The novel boric acid suspensions of the invention are comprised of a concentrated, finely dispersed suspension of boric acid and a small amount of a soluble borate salt in an aqueous medium. The preferred molar ratio of boric acid to alkaline agent to form the borate salt is 1.0:0.01 to 1:0.2.

The concentrated suspensions of the invention of finely dispersed boric acid with low amounts of borates for use in wood preserving salt paste or in the production of wooden materials ensures as uniform a dispersion of the boric acid as the corresponding solutions of boric acid in organic fluids. Moreover, these suspensions are safe to use and do not harm either the environment or the products containing them with unwanted organic compounds.

It was further found that the suspensions of the invention can be produced simply if a slurry of boric acid in water is mixed with an alkaline solution and briefly stirred. By maintaining proper reaction conditions and optionally adding dispersing agents, a suspension having a high degree of storability and long shelf-life is obtained.

The alternate method of producing boric acid suspensions from ground boric acid is disadvantageous for the following reasons: the higher the degree of fineness, the more elaborate the grinding process, and the degree of fineness obtained by the method of the invention could only be achieved with very elaborate and expensive setups. Finely ground powders create dust and processing them requires that specific protective regulations must be adhered to.

Moreover, in grinding, grains of non-uniform size are obtained and therefore a mixture of crystal fragments having a wide range of sizes occurs. A suspension prepared from this mixture does not lead to uniform distribution of the solid materials, as takes place with the suspension of the invention. Furthermore, the broken crystal fragments increased the viscosity so that an increase in the amount of water is necessary for the suspension. For these reasons, the suspension produced by the invention is not only simpler to prepare but is in ters of properties superior to the suspensions prepared from ground crystal fragments.

Starting material is technical grade crystalline or coarsely crystalline boric acid which is prepared as slurry with water, the ratio by weight of boric acid to water being 1:1 to 5:1. This slurry is mixed with an aqueous alkaline solution with brief stirring.

Since boric acid is slightly soluble in water or yields salts with alkaline solutions, the amount of water and thus also the alkaline solution should be kept as small an amount as possible. On the other hand, the slurry must contain enough water so that the boric acid mixture can be stirred, which depends on the method selected and, in the case of stirring for example, also on the kind and force of the stirring device. The alkaline agent added to the aqueous solution reacts with the boric acid forming the corresponding borate in relatively small amounts. For the intended uses of the suspensions, the borate content obtained in this way does not interfere. On the contrary, when using the suspension for fire protection purposes, an ammonium borate content is entirely desirable.

In the conversion of the boric acid by the invention, one skilled in the art would expect merely an acid-base reaction in the sense of neutralization of the slight alkali amount by the stoichiometrically equivalent boric acid amount. However, surprisingly, in addition to this macronanalytic easily observable neutralization, significantly more reactions are effected since after completion of the conversion, all the boric acid is present in finely crystalline suspended form.

Examples of alkaline solutions are dilute solutions of alkali metal or alkaline earth metal hydroxides or a basic ammonium, alkali metal or alkaline earth metal salt, an ammonia solution or a hot urotopine solution can be used. Such basic salts are, for example carbonates, phosphates, pyrophosphates or polyphosphates. Preferred is a concentrated ammonia solution. Small amounts of (0.1 to 1.0% by weight, relative to the total mixture) of commercial grade dispersing agent can be added to the slurry.

Immediately after the addition of the alkaline solution, the boric acid is briefly stirred so that all crystals can interact with the alkaline solution and this stirring can be carried out following a variety of methods known per se, by shaking, for instance, bubbling a gas through, pumping over or preferentially by stirring. The length of time for these treatments is between 15 and 60 minutes, depending on the temperature of the mixture, which can be in the range from 0° to 80° C., the amount of the alkaline solution used, and the crystal size of the used boric acid.

If boric acid of average crystalline size of 0.2 mm is used, the length of treatment time or the time during which the boric acid must be mixed at room temperature and with a molar boric acid to alkaline ratio of 1:0.05 is approximately 30 minutes. Subsequently, through re-crystallization processes, the mechanism of which is not clear, a suspension is formed with extremely fine boric acid particles and extremely small borate crystals primarily having a range of size below 1000 $\mu$m.

The obtained boric acid suspensions are highly suitable for preparing flame-retardant wooden particle or fiber board protected against wood-destroying organisms, if it is mixed during the manufacturing process with the particles, the fibers, or the glue of these boards. They are equally suited, together with other effective agents, for producing high-quality wood and fire protective agents in paste form, if dust formation is disturbing.

In the following example there are described several preferred embodients to illustrate the invention. However, it is to be understood that the invention is not intended to be limited to the specific embodiments.

EXAMPLE 1.237 g (20 moles) of a technical grade boric acid (average size of the crystals 0.2 mm) were suspended in 350 ml of deionized water under slight stirring (about 60 rpm of the stirrer) To this slurry, 32 g. (0.4 moles) of a 50% sodium hydroxide solution were added at room temperature and the resulting mixture was stirred intensively (about 600 rpm of the stirrer) for about 45 minutes. In this time, a fine boric acid suspension was formed in which the boric acid particles had an average particle size of about 800 $\mu$m. This suspension could be directly used in the fabrication of a flame retardant particle board.

Various other modifications of the compositions and method of the invention may be made without departing from the spirit or scope thereof and it is to be understood that the invention is intended to be limited only as defined in the appended claims.

What we claim is:

1. A suspension consisting essentially of a concentrated dispersed suspension of fine particles of boric acid and a soluble borate salt in an aqueous medium formed by adding a small amount of an aqueous solution of a soluble base to a suspension of boric acid in water with a molar ratio of boric acid to borate being 1.0:0.01 to 1.0:0.2 and the weight ratio of boric acid to water being 1:1 to 1:5 to recrystallize the boric acid as fine particles.

2. The suspension of claim 1 wherein the borate salt is selected from the group consisting of ammonium, alkali metal and alkaline earth metal salts.

3. The suspension of claim 1 wherein the salt is an ammonium salt.

4. A method of preparing the suspension of claim 1 comprising forming a slurry of boric acid in water and adding an aqueous alkaline solution to the slurry with agitation.

5. The method of claim 4 wherein the alkaline agent is selected from the group consisting of water soluble salts of alkali metals, alkaline earth metals and ammonia.

6. The method of claim 4 wherein the alkaline agent is ammonium hydroxide.

7. The method of claim 4 wherein a dispersing agent is added to the slurry.

8. In a method of producing fire retardant wood particle or hard fiber boards, the improvement comprising coating the particles or fibers with a suspension of claim 1.

* * * * *